United States Patent
Bang et al.

(10) Patent No.: US 7,643,185 B2
(45) Date of Patent: Jan. 5, 2010

(54) METHOD FOR TONE CALIBRATION AND APPARATUS USING THE SAME

(75) Inventors: Yousun Bang, Seoul (KR); Heui-keun Choh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 11/591,525

(22) Filed: Nov. 2, 2006

(65) Prior Publication Data
US 2007/0133061 A1 Jun. 14, 2007

(30) Foreign Application Priority Data
Dec. 8, 2005 (KR) .................. 10-2005-0119800

(51) Int. Cl.
*H04N 1/46* (2006.01)
(52) U.S. Cl. .................. 358/504; 358/1.9; 358/3.26; 358/500; 382/162; 382/167
(58) Field of Classification Search .................. 358/1.9, 358/3.26, 500, 504; 382/162, 167
See application file for complete search history.

(56) References Cited

U.S. PATENT DOCUMENTS

| | | | |
|---|---|---|---|
| 5,347,369 A | | 9/1994 | Harrington |
| 5,481,380 A | * | 1/1996 | Bestmann .................. 358/504 |
| 5,784,667 A | | 7/1998 | Mestha et al. |
| 5,917,511 A | * | 6/1999 | Ueda .................. 347/19 |
| 6,331,042 B1 | * | 12/2001 | Yamada .................. 347/19 |
| 2002/0030832 A1 | * | 3/2002 | Shibuya et al. .................. 358/1.9 |
| 2005/0281459 A1 | * | 12/2005 | Bala et al. .................. 382/162 |
| 2006/0244980 A1 | * | 11/2006 | Grace .................. 358/1.9 |
| 2006/0247877 A1 | * | 11/2006 | Bala et al. .................. 702/107 |

FOREIGN PATENT DOCUMENTS

| | | |
|---|---|---|
| JP | 06350838 A | 12/1994 |
| JP | 2001-94809 A | 4/2001 |
| JP | 2001136399 A | 5/2001 |
| JP | 2002-237960 A | 8/2002 |
| JP | 2002232730 A | 8/2002 |
| JP | 2005-20674 A | 1/2005 |
| KR | 19960016587 A | 5/1996 |

OTHER PUBLICATIONS

Naoya Katoh, et al.,"An Accurate Characterization of CRT Monitor (I) Verifications of Past Studies and Clarifications of Gamma", Optical Review 8(5), pp. 305-314.

* cited by examiner

*Primary Examiner*—Twyler L Haskins
*Assistant Examiner*—Miya J Cato
(74) *Attorney, Agent, or Firm*—Sughrue Mion, PLLC

(57) ABSTRACT

A method for tone calibration and an apparatus using the same are provided. The method for tone calibration includes outputting a reference patch of a predetermined color and a plurality of sample patches having different tone levels of constant intervals of the color, receiving an input of identification information of any one of the sample patches, and generating a lookup table, which is obtained by reflecting a distortion level of the reference patch, in accordance with the input identification information.

18 Claims, 8 Drawing Sheets

METHOD FOR TONE CALIBRATION AND APPARATUS USING THE SAME

CROSS-REFERENCE TO RELATED APPLICATION

This application claims priority from Korean Patent Application No. 10-2005-0119800, filed on Dec. 8, 2005, the disclosure of which is incorporated herein by reference in its entirety.

BACKGROUND OF THE INVENTION

1. Field of the Invention

Methods and apparatuses consistent with the present invention relate to tone calibration and, more particularly, to methods and apparatuses in which a tone of color reproduced by a color reproducing apparatus is calibrated to match its original color if the reproduced color becomes different from that of the original color due to a change of time and environment.

2. Description of the Prior Art

A color reproduced by a color reproducing apparatus such as a printer or a scanner tends to be distorted such that the reproduced color is different from its original color due to a change of use time and a change of environment of the color reproducing apparatus. In this respect, various tone calibration techniques have been developed to match a tone of the color reproduced by the color reproducing apparatus with the tone of the original color. For example, channel independent calibration and gray balance calibration are widely used as tone calibration methods for a printer. The channel independent calibration performs tone calibration for each channel of cyan (C), magenta (M), yellow (Y) and black (B). The gray balance calibration controls the ratio of C, M and Y by generating a neutral color.

According to channel independent calibration, the color reproducing apparatus outputs a reference patch that is representative of a reference tone of an original color and outputs sample patches that are representative of tones of various levels for the original color. A user then selects the sample patch that most closely matches the reference patch using the naked eye and inputs identification information of the selected sample patch. At this time, the color reproducing apparatus performs tone calibration in accordance with the input identification information.

However, if a tone of the color reproduced by the color reproducing apparatus is distorted due to a change of time or a change of environment, a tone of the reference patch may also be distorted. Therefore, according to the related art, since tone calibration is performed based on the assumption that the reference patch accurately reproduces the reference tone of the original color, the color reproduced after tone calibration may be distorted from the original color.

On the other hand, a color reproducing apparatus having a spectrometer can perform more accurate tone calibration. However, since a spectrometer is expensive, it is not suitable for a cheap color reproducing apparatus preferred by general users.

SUMMARY OF THE INVENTION

Accordingly, an aspect of the present invention provides a method for tone calibration and an apparatus using the same, in which a tone of color reproduced by a color reproducing apparatus is calibrated to match its original color if a tone of the reproduced color becomes different from that of the original color.

Aspects and features of the present invention will be set forth in the description which follows and will become apparent to those having ordinary skill in the art upon examination of the following or may be learned from practice of the invention.

An aspect of the present invention provides a method for tone calibration, which includes outputting a reference patch of a predetermined color and a plurality of sample patches having tone levels of constant intervals of the color, receiving an input of identification information regarding any one of the sample patches, and generating a lookup table, which is obtained by reflecting a distortion level of the reference patch, in accordance with the input identification information.

Another aspect of the present invention provides a color reproduction apparatus, which includes a color reproduction module outputting a reference patch of a predetermined color and a plurality of sample patches having tone levels of constant intervals of the color, and a lookup table generation module generating a lookup table, which is obtained by reflecting a distortion level of the reference patch, in accordance with identification information of any one of the sample patches.

BRIEF DESCRIPTION OF THE DRAWINGS

The above and other aspects, features and advantages of the present invention will become more apparent from the following detailed description taken in conjunction with the accompanying drawings, in which.

DETAILED DESCRIPTION OF EXEMPLARY EMBODIMENTS OF THE PRESENT INVENTION

Figure 1:
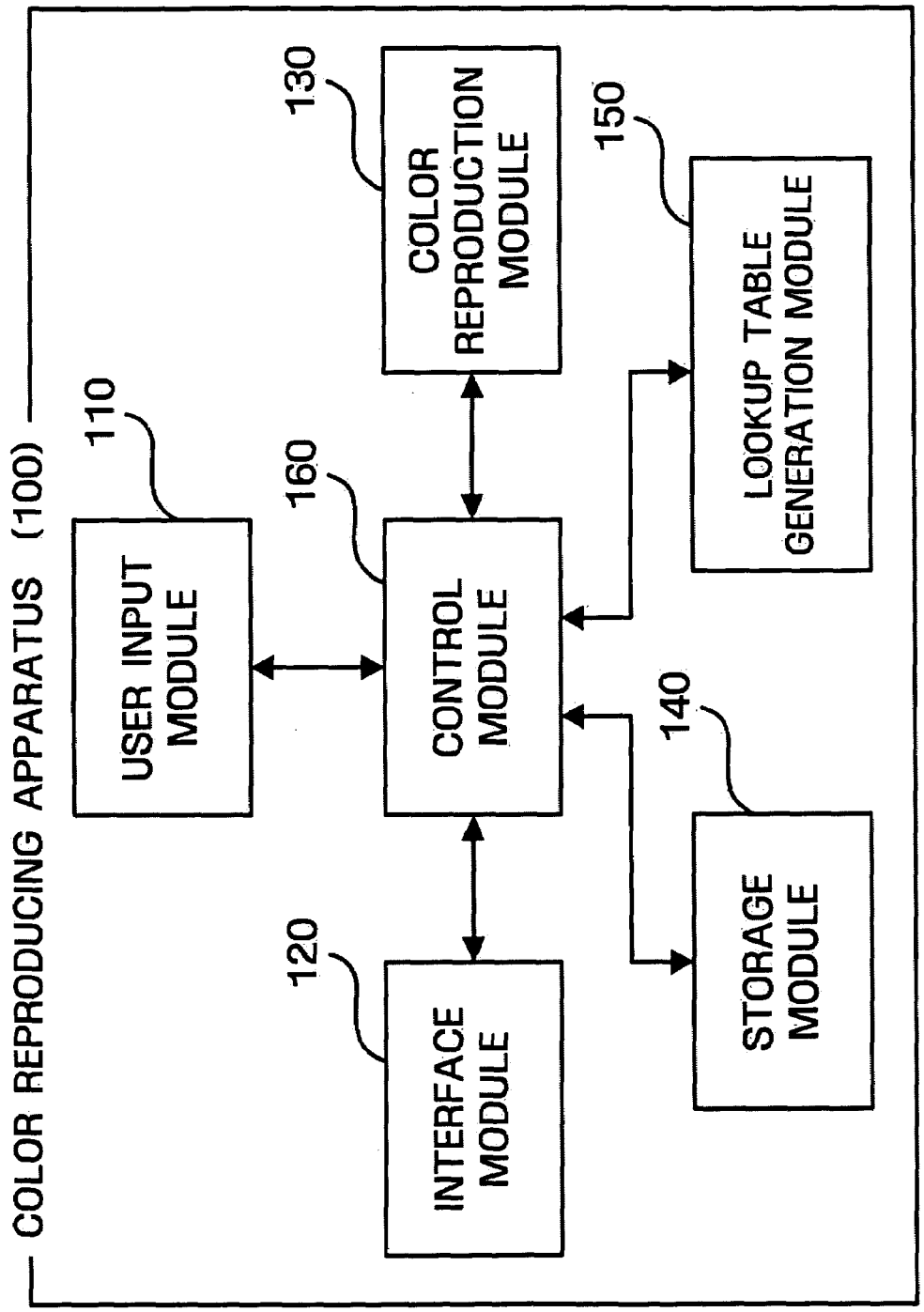
FIG. 1 is a block diagram illustrating the construction of a color reproducing apparatus according to an exemplary embodiment of the present invention.

Hereinafter, exemplary embodiments of the present invention will be described in detail with reference to the accompanying drawings. The various aspects and features of the present invention and methods for achieving various aspects and features of the present invention will be apparent by referring to the detailed description of the exemplary embodiments provided below with reference to the accompanying drawings. However, the present invention is not limited to the exemplary embodiments disclosed hereinafter, but can be implemented in many diverse forms. The matters defined in the description of exemplary embodiments below, such as the detailed construction and elements of various exemplary embodiments, are nothing more than illustrative details provided to assist those of ordinary skill in the art in a comprehensive understanding of the present invention. Importantly, the present invention is only defined by the scope of the appended claims. Throughout the following description of the exemplary embodiments of the present invention, the same drawing reference numerals are used for the same elements across various figures.

FIG. 1 is a block diagram illustrating the construction of a color reproducing apparatus according to an exemplary embodiment of the present invention. Referring to FIG. 1, the color reproducing apparatus 100 includes a user input module 110, an interface module 120, a color reproduction module 130, a storage module 140, a lookup table generation module 150, and a control module 160. Examples of the color reproducing apparatus 100 may include, but are not limited to, a printer, a scanner, and a copier.

According to the exemplary embodiment shown in FIG. 1, the user input module 110 receives a control command of the color reproducing apparatus 100 from a user. To this end, the user input module 110 includes an input means such as, for example, a key pad, a touch pad, or a touch screen.

The interface module 120 performs communication with an external device (not shown). For example, the interface module 120 receives color data to be reproduced, from an external device such as a notebook computer, a desktop computer, a PDA, or a digital camera, or receives the control command of the color reproducing apparatus 100. Examples of a communication medium that may be used to connect the interface module 120 with the external device include a wire medium such as a USB cable, a serial or a parallel port cable, and an optical cable, or a wireless medium such as infrared (IR) signals and radio frequency (RF).

The storage module 140 stores a predetermined lookup table. The lookup table includes conversion data that can convert color data input to the interface module 120 to match characteristics or printing conditions of the color reproducing apparatus 100.

The control module 160 converts the color data received by the interface module 120 from the external device into color information to be reproduced by the color reproduction module 130 using the lookup table stored in the storage module 140. Also, the control module 160 controls the operation of the modules 110, 120, 130, 140 and 150, which comprise the color reproducing apparatus 100.

The color reproduction module 130 performs color reproduction in accordance with the color information input from the control module 160. The color reproduction performed can be realized in various ways in accordance with the type of the color reproducing apparatus 100. For example, if the color reproducing apparatus 100 is a color printer, the color reproduction module 130 may include a header of the color printer and a header driving circuit. Also, the color reproduction module 130 can perform the printing function on a printing medium, such as paper, using a toner or an ink cartridge of CMYK.

Meanwhile, the color reproduction module 130 can output a tone calibration page. The tone calibration page includes, for example, a reference patch and a plurality of sample patches. The reference patch represents a reference tone of a predetermined color. The sample patches have tone levels of constant intervals for a color of the reference patch. Preferably, but not necessarily, a color provided through the tone calibration page is a basic color, such as CMYK, used to reproduce various colors.

Figure 2:
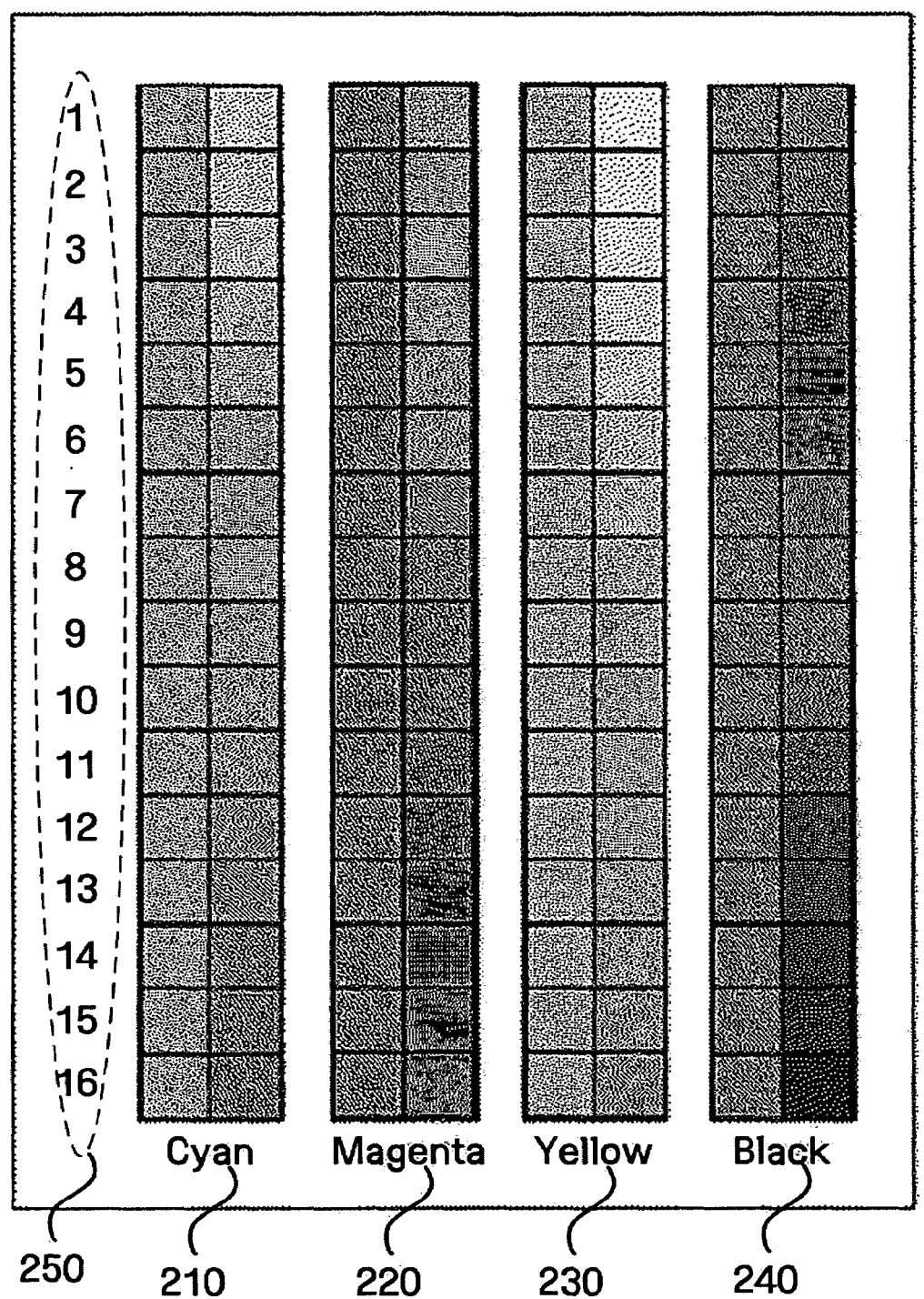
FIG. 2 is a view illustrating a tone calibration page according to an exemplary embodiment of the present invention.

An illustrative tone calibration page according to an exemplary embodiment of the present invention is shown in FIG. 2. Referring to FIG. 2, a total of 16 reference patches and sample patches for C 210, M 220, Y 230, and K 240, and identification information 250 corresponding to each sample patch are shown. As shown in FIG. 2, the patches in the left columns of the respective colors 210, 220, 230 and 240 are the reference patches and the patches in the right columns thereof are the sample patches. For the respective colors 210, 220, 230 and 240, the reference patches all have the same tone, and the sample patches have different tone levels of constant intervals. As shown in FIG. 2, the tone of the sample patches is increasingly darker in a downward direction.

Although the patches of the respective colors 210, 220, 230 and 240 in the exemplary tone calibration page shown in FIG. 2 are all displayed in black and white, the patches of the tone calibration page actually output from the color reproduction module 130 all have suitable colors. The user can select the sample patch closest to the reference patch for each of the colors 210, 220, 230 and 240, respectively, through the tone calibration page and can input identification information of the selected sample patch through the external device or through the user input module 110.

If identification information of any one of the sample patches is input, the lookup table generation module 150 generates a lookup table, which is obtained by reflecting a distortion level of the reference patch, in accordance with the input identification information. To this end, the lookup generation module 150 determines a distortion level of a reference patch of each color in the tone calibration page output from the color reproduction module 130 and updates conversion data included in the lookup table stored in the storage module 140 in accordance with the determined distortion level. To determine the distortion level, the lookup table generation module 150 can use, for example, a tone reproduction function and a luminance function. For instance, the tone reproduction function may represent the relation between tone levels of basic colors (colors included in the tone calibration page, e.g., CMYK) input to the color reproducing apparatus 100 and luminance of the basic color reproduced by the color reproducing apparatus 100. On the other hand, the luminance function may represent the relation between the distortion level of the reference patch and the luminance of the reference patch. It is noted that the tone reproduction function and the luminance function are previously set by an experiment for the color reproducing apparatus 100.

Hereinafter, the process of obtaining the tone reproduction function and the luminance function in accordance with an exemplary embodiment of the present invention will be described. As used below, the original level means, for example, the case where the color reproduced by the color reproducing apparatus 100 is normal while the distortion level means, for example, the case where the color reproduced by the color reproducing apparatus 100 is distorted. It is to be understood that the tone reproduction function and the luminance function will not be limited to the following exemplary descriptions.

Exemplary Process of Obtaining Tone Reproduction Function

N test patches having different tone levels of constant intervals are output per original level and distortion level, for a predetermined color of the color reproducing apparatus 100. Modification can be made in an EP parameter, a half-toning pattern and an international color consortium (ICC) color profile for the color reproducing apparatus 100 in order to reproduce the distortion level.

Afterwards, the luminance of the test patches is measured to obtain spectral data, and a tone graph of the original level and the distortion level can be obtained using the spectral data. In this case, a function representing the tone graph may be referred to as the tone reproduction function. For example, CIE L* color scale data for each test patch can be obtained using a spectrophotometer, and a drift line of CIE L* data can be obtained using least square regression. Preferably, but not necessarily, a gain, gamma, offset (GGO) model can be used for fitting of the tone graph, and the tone reproduction function can be expressed by Equation (1) below.

$$y = a\left(\frac{x}{255}\right)^{\gamma} + c \qquad (1)$$

In Equation (1), x represents a tone level ($0 \leq x \leq 255$) of a predetermined color, and $\gamma$ is a numerical value (distortion parameter) representative of a distortion level during color reproduction. Also, a and c, which are constants, may depend on the distortion level of the color reproducing apparatus 100. However, according to an experimental result, if modeling is made using Equation (1), a fluctuation range of the constants a and c is small in the original level and a plurality of distortion levels of the color reproducing apparatus 100. Accordingly, the constants a and c can each be fixed as an average value of values measured in each level. By way of reference, "An accurate characterization of crt monitor(i) verifications of past studies and clarifications of gamma," Optical Review 8(5), pp. 305-314 by N. Katoh, T. Deguchi, and R. Berns, can be provided to analyze the GGO model.

Figure 3:
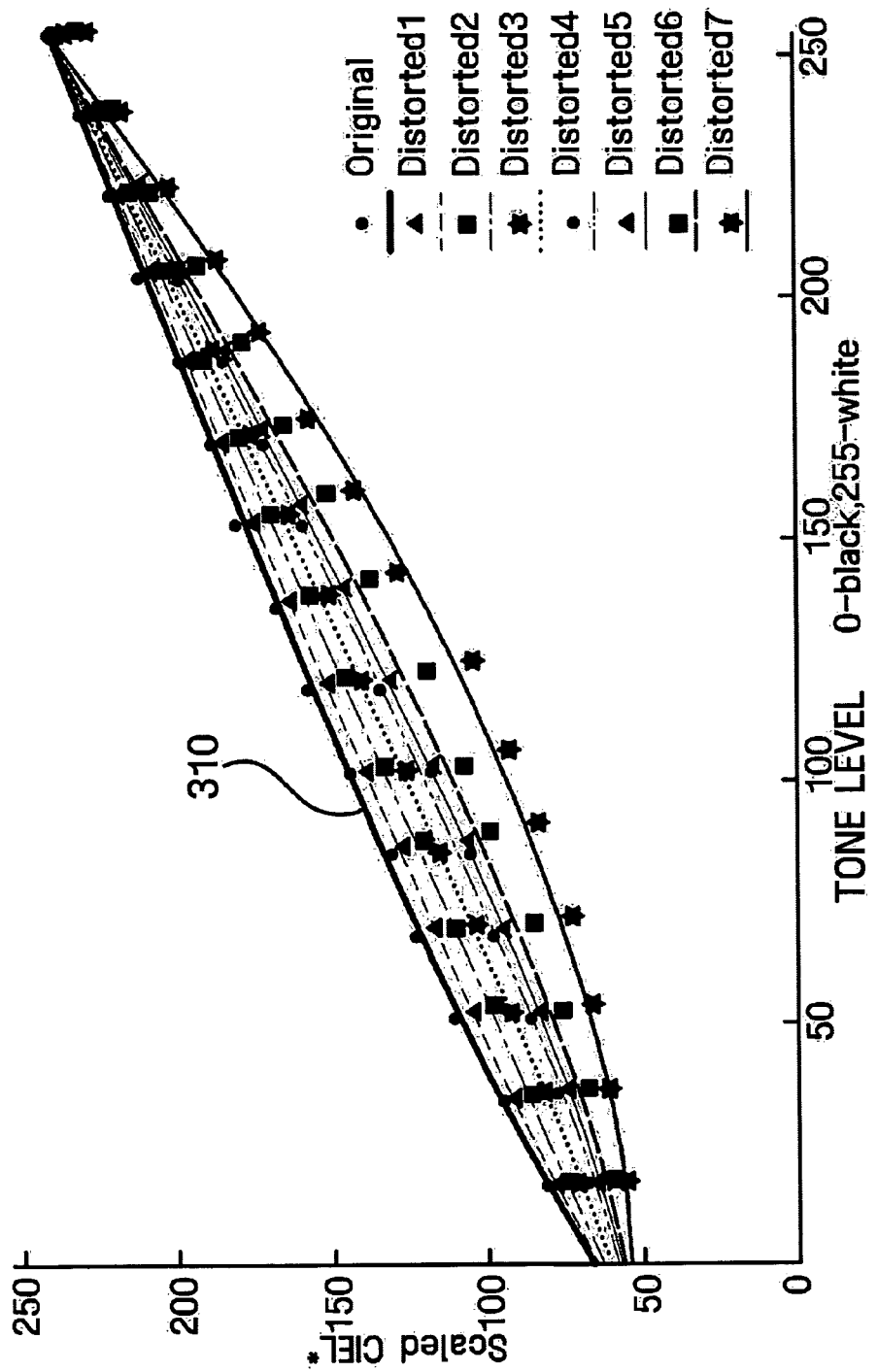
FIG. 3 is a view illustrating a tone graph according to an exemplary embodiment of the present invention.

FIG. 3 illustrates a tone graph according to an exemplary embodiment of the present invention. The tone graph shown in FIG. 3 can be obtained as a result of an experiment for a black channel in an original level and seven distortion levels of the color reproducing apparatus 100. Referring to FIG. 3, a first curve 310 is obtained by a tone reproduction result in the original level of the color reproducing apparatus 100. The first curve 310 can be set as a target curve during tone calibration. The other curves shown in FIG. 3 are obtained by a tone reproduction result in the seven distortion levels. The distortion parameter $\gamma$ in the original level and the distortion levels can be obtained through the tone reproduction function (e.g., Equation (1)).

Design of a Reference Patch

Figure 4:
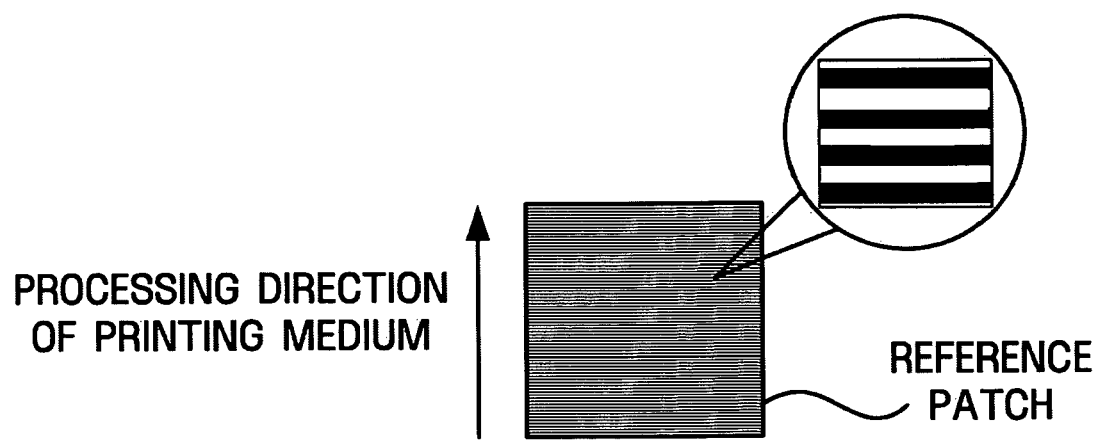
FIG. 4 is a view illustrating a reference patch according to an exemplary embodiment of the present invention.

Since patches with a plurality of lines are less affected by the distortion level of the color reproducing apparatus 100 than uniformly colored patches, it is preferable, but not necessary, that the reference patch has a line screen pattern as shown in FIG. 4. Each line constituting the reference patch is preferably, but not necessarily, perpendicular to a processing direction of a printing medium (e.g., paper) processed by the color reproducing apparatus 100. As shown in FIG. 4, the reference patch has a line period of 50 cycles per inch and a filled line pattern of 50%.

Process of Obtaining Luminance Function

Figure 5:
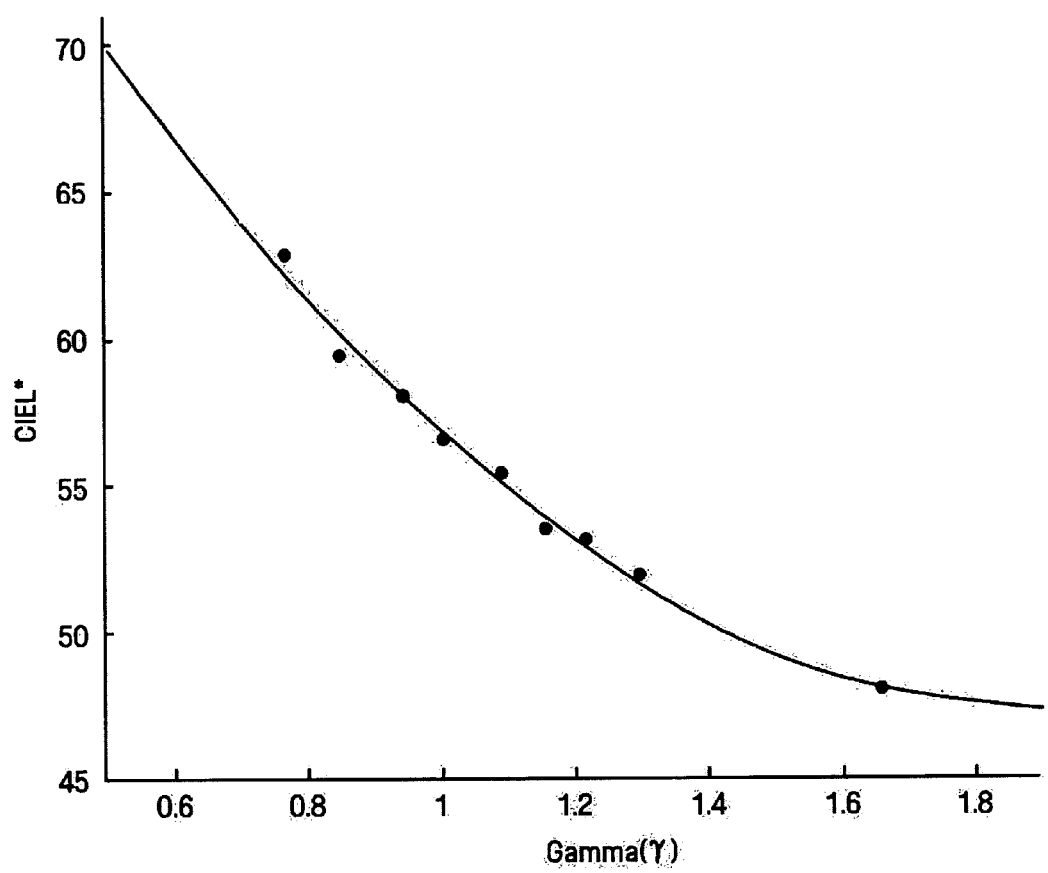
FIG. 5 is a graph illustrating luminance variation of a reference patch according to a distortion parameter.

If the reference patch is designed, then the luminance function is obtained to predict luminance variation of the reference patch in accordance with tone distortion variation of a color reproduced by the color reproducing apparatus 100. The luminance function represents luminance variation of the reference patch output by the color reproducing apparatus 100 in accordance with variation of the distortion parameter. Luminance of the reference patch output by the color reproducing apparatus 100 in accordance with the distortion parameter is measured to obtain the luminance function, and the luminance function can be obtained by modeling the measured result using least square regression. FIG. 5 is a graph illustrating luminance variation of the reference patch according to the distortion parameter. A function corresponding to the graph of FIG. 5 may be used as the luminance function.

The tone reproduction function and the luminance function can be set per basic color (e.g., CMYK) used by the color reproducing apparatus 100 to reproduce various colors. Also, the lookup table generation module 150 of the color reproducing apparatus 100 stores the color reproduction function and the luminance function per basic color through the aforementioned methods, and uses the functions for tone calibration of the basic color. The lookup table generation module 150 will be described in more detail with reference to FIG. 6.

Figure 6:
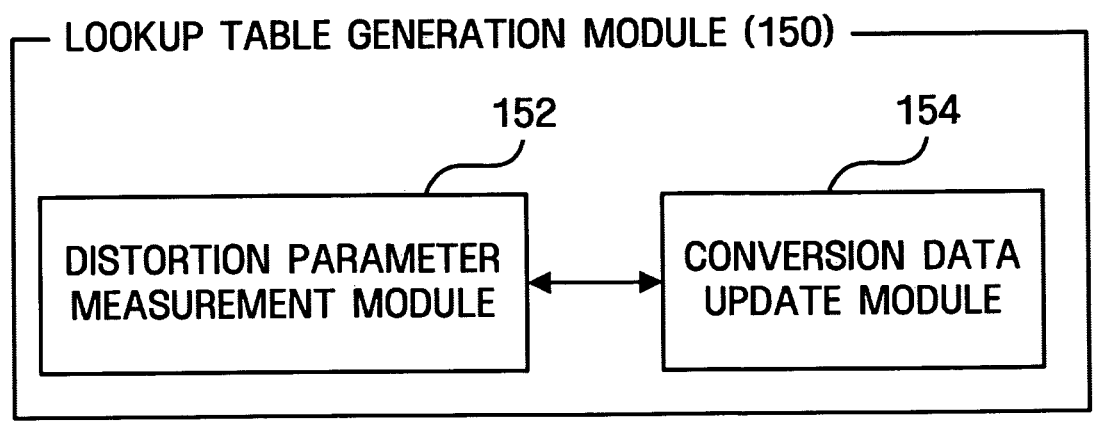
FIG. 6 is a block diagram illustrating a lookup table generation module of FIG. 1.

FIG. 6 is a block diagram illustrating the construction of the lookup table generation module 150 of FIG. 1. As shown in FIG. 6, the lookup table generation module 150 includes a distortion parameter measurement module 152 and a conversion data update module 154.

The distortion parameter measurement module 152 measures the distortion parameter using the tone level, the tone reproduction function and the luminance function, wherein the tone level corresponds to identification information of the sample patch input by the user who has identified the tone calibration page, and the tone reproduction function and the luminance function are previously set. The distortion parameter can be obtained by Equation (2) below.

$$L(\gamma_d) = T(\gamma_d, D) \qquad (2)$$

Here, L( ) represents the luminance function, T( ) represents the tone reproduction function, D represents the tone level corresponding to the identification information of the input sample patch, and $\gamma_d$ represents the distortion parameter to be obtained by the distortion parameter measurement module 152. The tone level has an integer value in the range of [0 to 255].

If Equation (1) is used as the tone reproduction function, Equation (3) below can be used to obtain the distortion parameter.

$$L_P(\gamma_d) = a\left(\frac{D}{255}\right)^{\gamma_d} + c \qquad (3)$$

In Equation (3), a and c are constants and can each have an average value of values measured in the original level and different distortion levels of the color reproducing apparatus 100, as described above with reference to Equation (1). The distortion parameter $\gamma_d$ can be calculated using a numerical value analysis method such as a Newton-Raphson Method.

The conversion data update module 154 updates the conversion data included in the lookup table stored in the storage module 140 using the distortion parameter $\gamma_d$ measured by the distortion parameter measurement module 152. Equation (4) below can be used to update the conversion data.

$$x' = 255\left(\frac{x}{255}\right)^{\gamma_0/\gamma_d} \quad (4)$$

In Equation (4), x represents the conversion data included in the lookup table stored in the storage module 140, $\gamma_0$ represents the distortion parameter in the original level (e.g., in the first line 310 corresponding to the target curve shown in the graph of FIG. 3), $\gamma_d$ represents the distortion parameter calculated by the distortion parameter measurement module 152, x' represents the conversion data to be updated by the conversion data update module 154.

The term "unit," comprising the color reproducing apparatus 100 as illustrated in FIG. 1 and FIG. 6, means, but is not limited to, a software or hardware component, such as a Field Programmable Gate Array (FPGA) or Application Specific Integrated Circuit (ASIC), which performs certain tasks. A "module" may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules, than as described above, or further separated into additional components and modules.

Hereinafter, the operation of the aforementioned color reproducing apparatus 100 will be described with reference to FIG. 7.

Figure 7:
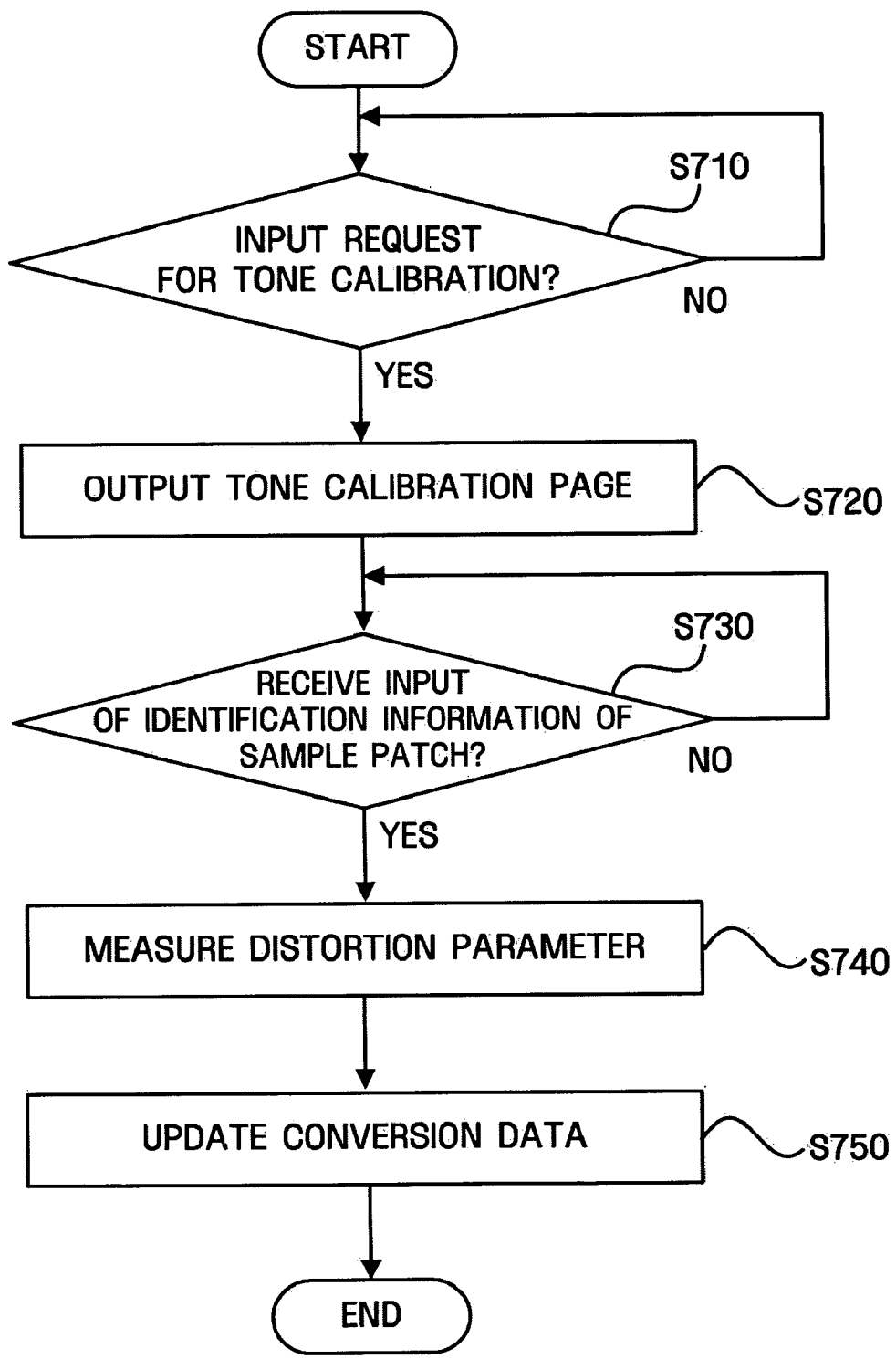
FIG. 7 is a flowchart illustrating a method for tone calibration according to an exemplary embodiment of the present invention.

FIG. 7 is a flowchart illustrating a method for tone calibration according to an exemplary embodiment of the present invention.

If a request for tone calibration is input in operation S710, the color reproduction module 130 outputs the tone calibration page in operation S720. The request for tone calibration may be received from the external device to the color reproduction module 130 through the interface module 120, or may directly be input from the user through the user input module 110.

One example of the tone calibration page is as shown in FIG. 2, as described above. The user selects the sample patch having a tone the most similar to that of the reference patch, with reference to the tone calibration page, and inputs the identification information of the selected sample patch through the external device or the user input module 100.

If the identification information of the sample patch is input in operation S730, the distortion parameter measurement module 152 calculates the distortion parameter using the tone level, the tone reproduction function, and the luminance function corresponding to the input identification information in operation S740.

Afterwards, the conversion data update module 154 updates the conversion data included in the lookup table stored in the storage module 140 using the distortion parameter in operation S750.

The above steps can be performed in parallel for the basic colors used to reproduce various colors. Accordingly, a new lookup table obtained by reflecting the distortion level of the color reproducing apparatus 100 is generated, and the color reproducing apparatus 100 performs the color reproduction processes using the new lookup table.

Figure 8:
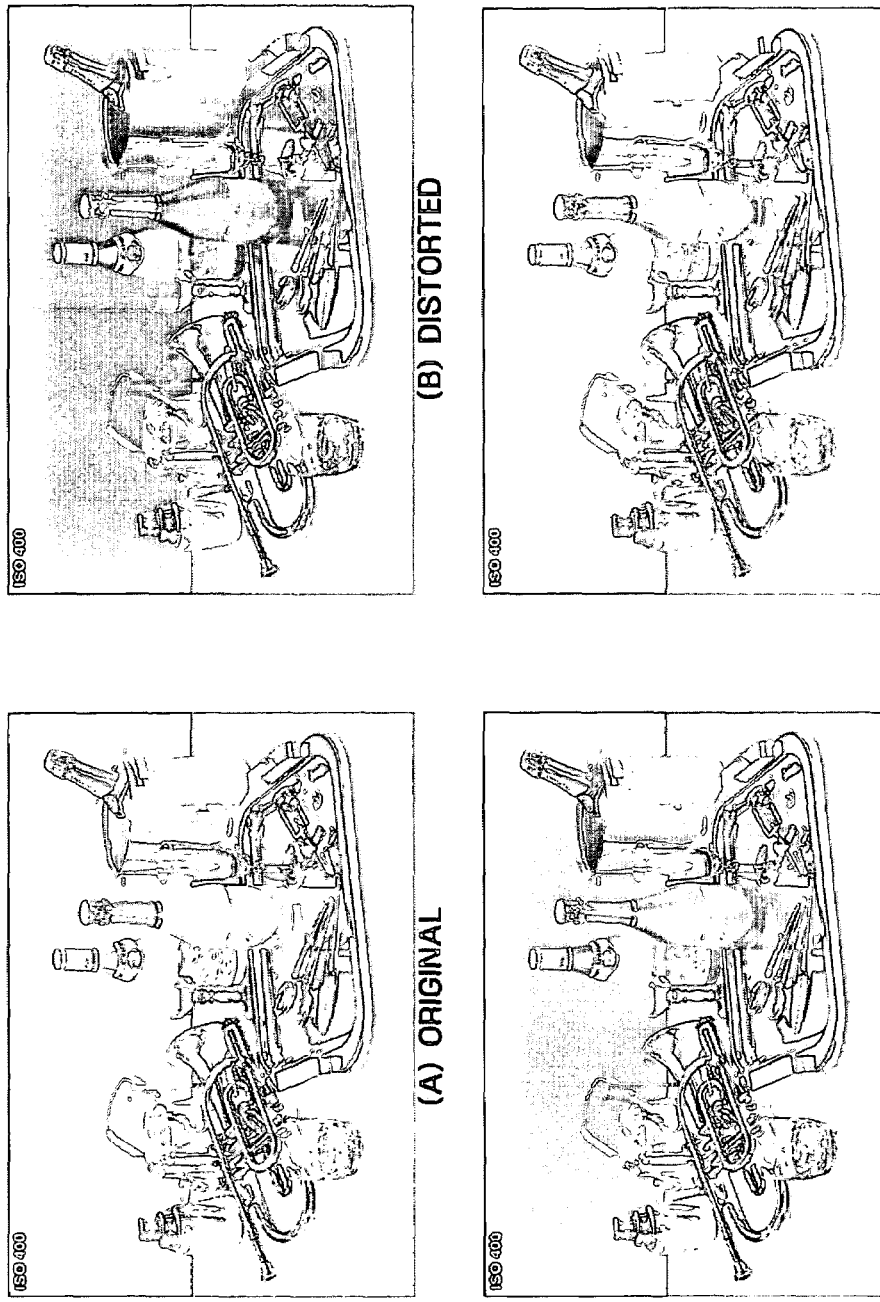
FIG. 8 is a view illustrating a result of color reproduction according to an exemplary embodiment of the present invention.

FIG. 8 is a view illustrating the result of color reproduction according to an exemplary embodiment of the present invention.

As shown in FIG. 8, a difference occurs between the color reproduction result (A) obtained using the original level of the color reproducing apparatus 100, and the color reproduction result (B) obtained using the distortion level. As further shown in FIG. 8, if the tone calibration process is performed in accordance with the prior art, the distortion level of the color reproducing apparatus 100 is not reflected well due to distortion of the reference patch and, as a result, a difference occurs using the conventional tone calibration process and this difference is evident from a comparison between the color reproduction result (C), obtained using the conventional process, and the color reproduction result (A), obtained using the original level. However, since, according to the present invention, the tone calibration process is performed by reflecting the distortion level of the reference patch, the color reproduction result (D) obtained consistent with the present invention, approaches more closely to the color reproduction result (A) obtained using the original level.

As described above, according to the present invention it is possible to perform the tone calibration process by reflecting the distortion level of the color reproducing apparatus without using expensive equipment.

The exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention is defined by the appended claims and their legal equivalents.

What is claimed is:

1. A method for tone calibration implemented by a color reproducing apparatus, the method comprising:
   outputting a reference patch of a predetermined color by a color reproduction module;
   outputting a plurality of sample patches having different tone levels of constant intervals of the color by a color reproduction module;
   receiving an input comprising identification information regarding any one of the sample patches by a lookup table generation module; and
   generating a lookup table using a tone reproduction function, a luminance function, and the input identification information by a lookup table generation module, wherein the lookup table is obtained by reflecting a distortion level of the reference patch,
   wherein the tone reproduction function represents a relation between a tone level of an input color and a luminance of a reproduced input color if the input color is reproduced; and
   wherein the luminance function represents a relation between a distortion parameter representative of the distortion level of the reference patch and luminance of the reference patch.

2. The method of claim 1, wherein generating a lookup table comprises:
   measuring the distortion parameter; and
   updating conversion data included in the lookup table using the measured distortion parameter.

3. The method of claim 1, wherein measuring the distortion parameter comprises measuring the distortion parameter using a tone reproduction function, a luminance function, and the input identification information.

4. The method of claim 3, wherein the tone reproduction function is obtained by applying least square regression to a luminance value of the reproduced color according to the tone level of the input color per distortion level of the reference patch.

5. The method of claim 4, wherein the tone reproduction function is expressed as $$y = a\left(\frac{x}{255}\right)^{\gamma} + c,$$

wherein x represents the tone level of the input color,
wherein y is a luminance value for the tone level,
wherein a and c are constants, and
wherein $\gamma$ is the distortion parameter representative of the distortion level during color reproduction.

6. The method of claim 3, wherein the luminance function is obtained by applying least square regression to a luminance value of the reference patch according to the distortion parameter.

7. The method of claim 3, wherein the distortion parameter is obtained using the equation $L(\gamma_d)=T(\gamma_d,D)$,
wherein L( ) represents the luminance function,
wherein T( ) represents the tone reproduction function,
wherein D represents a tone level corresponding to the input identification information, and
wherein $\gamma_d$ represents the distortion parameter.

8. The method of claim 3, wherein the conversion data are updated using the equation $$x' = 255\left(\frac{x}{255}\right)^{\gamma_o/\gamma_d},$$

wherein x represents the conversion data before being updated,
wherein x' represents updated conversion data,
wherein $\gamma_d$ represents the measured distortion parameter, and
wherein $\gamma_o$ represents a distortion parameter obtained using the tone reproduction function in a state that the reference patch is not distorted.

9. The method of claim 1, wherein the color includes at least one of cyan, magenta, yellow, and black.

10. A color reproducing apparatus comprising: a color reproduction module, which outputs a reference patch of a predetermined color and which outputs a plurality of sample patches having different tone levels of constant intervals of the color; and
a lookup table generation module which generates a lookup table,
wherein the lookup table is obtained by reflecting a distortion level of the reference patch, and
wherein the lookup table is obtained in accordance with input identification information regarding any one of the sample patches, a tone reproduction function and a luminance function,
wherein the tone reproduction function represents a relation between a tone level of an input color and luminance of a reproduced input color if the input color is reproduced, and
wherein the luminance function represents a relation between a distortion parameter representative of the distortion level of the reference patch and luminance of the reference patch.

11. The color reproducing apparatus of claim 10, wherein the lookup table generation module comprises:
a distortion parameter measurement module which measures the distortion parameter; and
a conversion data update module which updates conversion data included in the lookup table using the measured distortion parameter.

12. The color reproducing apparatus of claim 11, wherein the distortion parameter measurement module measures the distortion parameter using a tone reproduction function, a luminance function, and the input identification information.

13. The color reproducing apparatus of claim 12, wherein the tone reproduction function is obtained by applying least square regression to a luminance value of the reproduced color according to the tone level of the input color per distortion level of the reference patch.

14. The color reproducing apparatus of claim 13, wherein the tone reproduction function is expressed as $$y = a\left(\frac{x}{255}\right)^{\gamma} + c,$$

wherein x represents the tone level of the input color,
wherein y is a luminance value for the tone level,
wherein a and c are constants, and
wherein $\gamma$ is the distortion parameter representative of the distortion level during color reproduction.

15. The color reproducing apparatus of claim 12, wherein the luminance function is obtained by applying least square regression to a luminance value of the reference patch according to the distortion parameter.

16. The color reproducing apparatus of claim 12, wherein the distortion parameter is obtained using the equation $L(\gamma_d)=T(\gamma_d,D)$,
wherein L( ) represents the luminance function,
wherein T( ) represents the tone reproduction function,
wherein D represents a tone level corresponding to the input identification information, and
wherein $\gamma_d$ represents the distortion parameter.

17. The color reproducing apparatus of claim 12, wherein the conversion data are updated using the equation $$x' = 255\left(\frac{x}{255}\right)^{\gamma_o/\gamma_d},$$

wherein x represents the conversion data before being updated,
wherein x' is updated conversion data,
wherein $\gamma_d$ represents the measured distortion parameter, and
wherein $\gamma_o$ represents a distortion parameter obtained using the tone reproduction function in a state that the reference patch is not distorted.

18. The color reproducing apparatus of claim 10, wherein the color includes at least one of cyan, magenta, yellow, and black.

* * * * *